Sept. 22, 1959　　　R. E. HEFFNER　　　2,905,242
PRODUCTION CONTROL AND RECORDING SYSTEM
Filed May 5, 1958　　　　　　　　　　　　2 Sheets-Sheet 1

INVENTOR
Robert E. Heffner
BY
Howard B. Funk
ATTORNEY

Sept. 22, 1959 — R. E. HEFFNER — 2,905,242
PRODUCTION CONTROL AND RECORDING SYSTEM
Filed May 5, 1958 — 2 Sheets-Sheet 2

INVENTOR
Robert E. Heffner
BY
Howard C. Funk
ATTORNEY

United States Patent Office 2,905,242
Patented Sept. 22, 1959

2,905,242

PRODUCTION CONTROL AND RECORDING SYSTEM

Robert E. Heffner, Cleveland, Ohio, assignor to Aluminum Company of America, Pittsburgh, Pa., a corporation of Pennsylvania Application May 5, 1958, Serial No. 733,143

7 Claims. (Cl. 164—47)

My invention relates to a production control and recording system and is particularly adapted for supervising production on a power squaring shear, although it can be used to advantage in connection with other types of production equipment.

In-plant square shearing of metal sheets and plates on a power squaring shear to customer specifications is frequently required, the shear being known as a guillotine shear. The starting stock, or sheets, that is to be cut into dimensioned pieces to size and squareness specifications has to be individually manipulated by the shear operator. Since different operators usually cut-up the sheet according to their individual whims, there may be considerable variation in the number of finished pieces and amount of scrap produced from each lot of stock sheets. To avoid this, shearing programs are set up as production standards and they are devices to obtain maximum finished piece production from a sheet lot and to provide satisfactory degrees of squareness within customer's requirements. As between these production standards, one lot of sheets is subjected to a shearing program different from that applied to another lot to obtain the desired finished product, but all with the end in view of satisfying customer requirements with respect to squareness.

It is a primary object of my invention to provide a selective production control and recording system having the characteristics of requiring operator adherence to a prescribed program or method of operation and recording the resulting production.

Another object is to provide a system of the character referred to which is selectively preset for a prescribed operating program or schedule by authorized personnel only and which is operative to make an accurate count of the number of finished items produced to that schedule, the number of tasks started and properly completed to that schedule and the number of tasks started but not completed in accordance with the preselected schedule.

As applied to a guillotine shear, it is a further object to provide a system which is responsive to a plurality of different operating schedules in the production of square cut pieces from starting sheets and which discriminates between schedules to give operator credit for work tasks started and completed to a preselected schedule in accordance with the labor required of the operator for that schedule, thereby to provide an incentive for adhering to the schedule.

A still further object of the invention is to provide sheet sensing means and sheet locating means on the table of a guillotine shear and in using such means in a production recorder to control the operation of the recorder and prevent attempts to effect false operations thereof.

The foregoing and other objects and advantages of the invention will be made more apparent from consideration of the following detailed description of the embodiment thereof illustrated in the accompanying drawings, in which.

Figure 1:
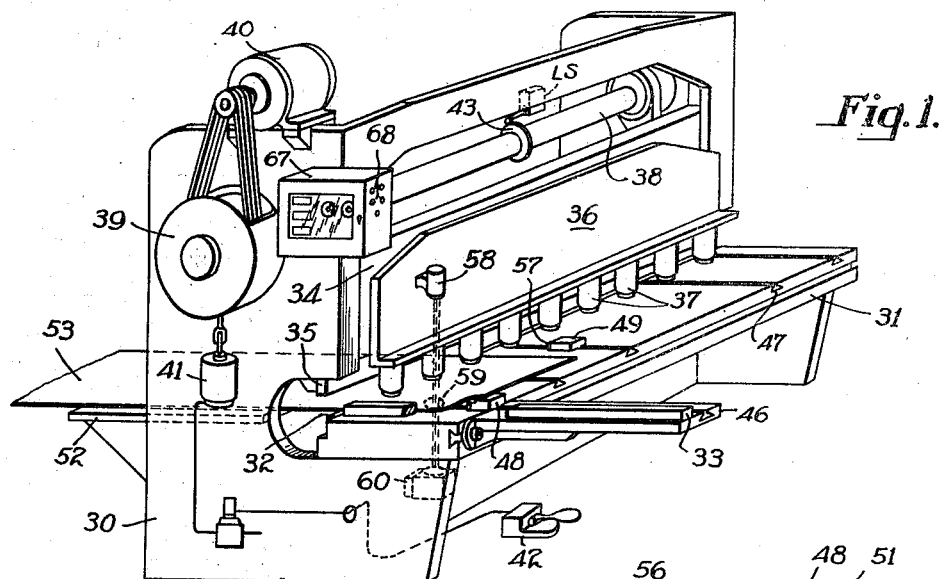
Fig. 1 is a somewhat schematic perspective representation of a guillotine shear equipped with a production control and recorder system incorporating the present invention and illustrating a sheet in position for making an initial or starting cut thereon.
Figure 2:
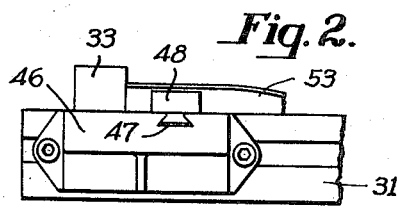
Fig. 2 is a detail elevational view of a portion of the shear table illustrated in Fig. 1 and showing more clearly the lateral straight edge rail and a length gauge or stop for locating the material to be cut with respect to the cutting blades or knives of the shear.

Referring to Fig. 1, there is illustrated a well known form of power squaring shear of the guillotine type. It has the usual side members 30, front table 31, which carries the fixed knife 32 and the straight edge bar 33 in right angle relation to the knife, and a knife beam or slide 34 which carries the movable knife 35. A hold-down beam 36 disposed in front of the knife beam carries a series of hold-down members 37 for engaging work resting on table 31 to secure the same against displacement upon descent of the knife beam and its shear knife 35. The hold-down members may be of the spring or fluid pressure actuated type, as well known in the art. The knife beam and hold-down beam are operatively connected to the usual eccentric equipped shaft 38, which shaft is adapted to be driven through a clutch mechanism 39 from a suitable motor 40. As is customary, the clutch mechanism, which may be of any type well known in the art, is designed to be driven continuously by the motor and, when tripped or actuated, to transmit power to shaft 38 and cause the knife beam and its associated shear knife to be reciprocated through one operating cycle consisting of a down and up knife stroke. Clutch operation may be effected by conventional means actuated by power cylinder 41 controlled by the shear operator by means of a suitable foot treadle controller 42. Since the shear, per se, forms no part of my present invention and any known form thereof may be employed, it is deemed unnecessary to describe the same in greater detail. However, for control purposes, I provide a limit switch LS on the shear, which may suitably be actuated by cam 43 on the shaft 38, to provide an electric signal each time the shear is operated.

The table 31 is shown as provided with the usual dovetail slot in its front face adapting it for attachment of a table extension member 46, as desired. Similar dovetail slots 47 may be provided in the top face of the table, parallel to straight edge bar 33, for laterally spaced mounting of gauge blocks or stops on the table. I provide two such blocks 48 and 49 which serve as a length gauge and a width gauge, respectively, each suitably having a loose dove-tail base 50 adapted to be received in a groove 47 and to be clamped by suitable screws 51, whereby each gauge block may be adjustably positioned with its front face at a fixed gauging distance from the shear blade 32. In order to facilitate sheet handling and in-feed of the sheets to be cut, which preferably is effected from the rear side of the shear, a sheet supporting table 52 is provided back of the movable knife and extends between the end members 30. As indicated, a sheet 53 to be sheared may readily be placed on rear table 52 and pushed past the shear knives onto front table 31 for placement in shearing position, as hereinafter described.

Figure 3:
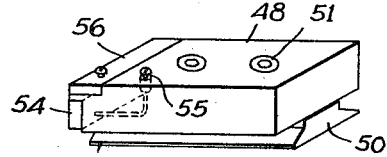
Fig. 3 is a perspective view of a form of gauge or stop which may be used on the shear table and which is provided with "overcut" and "finish cut" contacts that are employed in the production control circuits.

In accordance with my invention, I use the gauge blocks for electrical control purposes and, hence, in the form illustrated, make them of insulation material. Block 48 (Fig. 3) is provided with a front contact bar 54 in the gauging face thereof to serve as a "finish cut" contact. A screw terminal 55 suitably connected to bar 54 permits convenient attachment of a circuit wire to the bar 54. Block 48 is also provided with a top or what I term an "overcut" contact, this being a bar 56 on the top of the block for engagement by an overlying portion of sheet 53, a screw terminal facilitating connection of a circuit wire to the overcut contact. Gauge block 49 is of similar construction, except that it need only be provided with a "finish cut" contact 57 in its gauging face corresponding to contact 54 of block 48. Of course, I use these gauge block contacts selectively, as hereinafter described, and they constitute sheet positioning or locating means for determining proper positioning of the sheet in the shear for cutting in accordance with a prescribed operating program.

I also provide a sheet detector or sensing means on the shear for control purposes to assure the presence of a sheet therein and forestall attempts to obtain a false production count. It may take various forms, such as a sheet actuated limit switch, but I prefer to use a photoelectric sensor comprising light source 58 mounted on hold-down beam 36 and arranged to project its light rays down through opening 59 in table 31 onto photo-electric cell 60.

Figure 5:
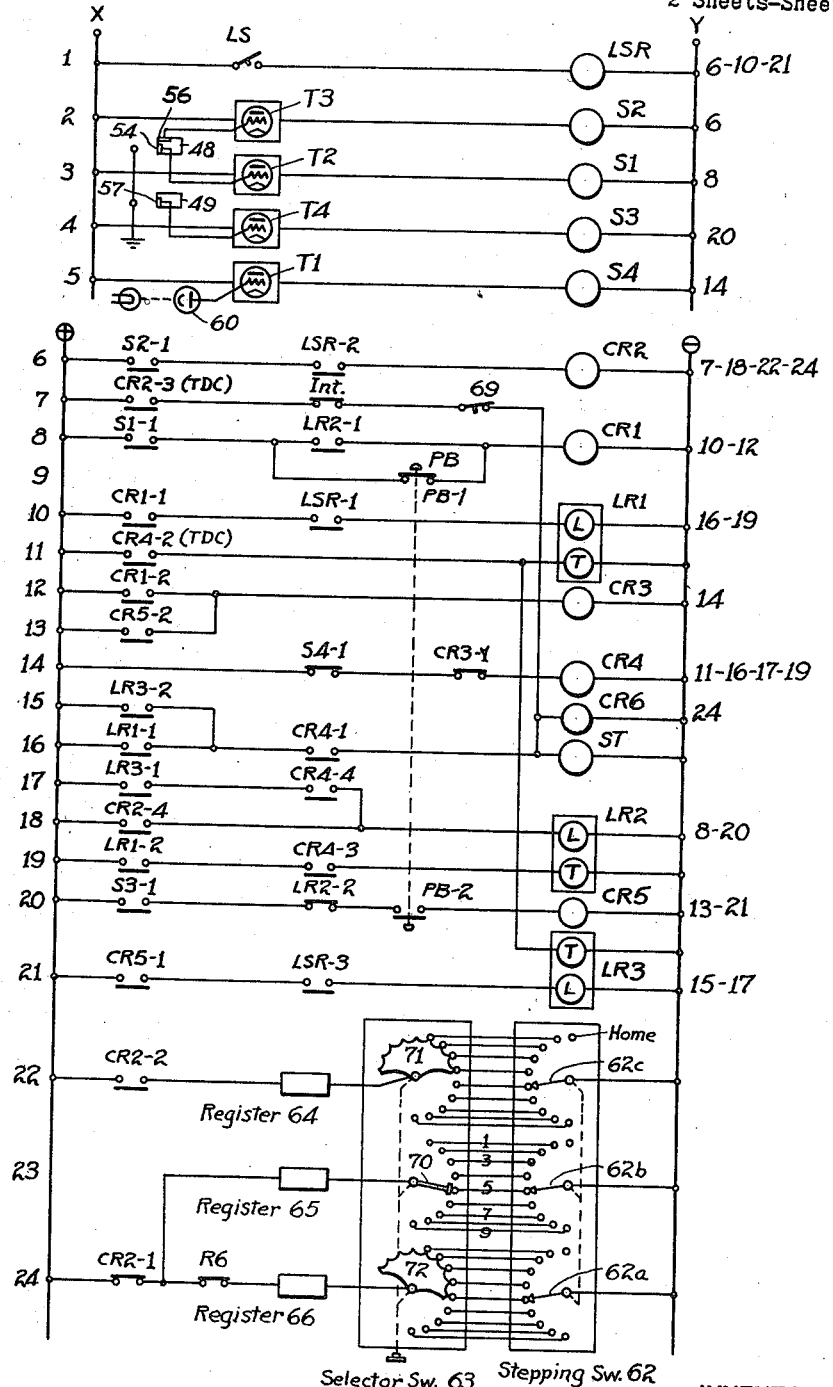
Fig. 5 is a schematic wiring diagram of the system incorporating the invention.

As shown in Fig. 5, conventional thyratron tube controlled electronic switches or relays S1, S2, S3 and S4 are provided. Photocell 60 controls the grid circuit of tube T1, and its associated switch S4 (circuit line 5) is energized to hold its contacts S4–1 in circuit line 14 in open position so long as light to cell 60 is interrupted. The gauge block contacts 54, 56 and 57 control the grid circuits of tubes T2, T3 and T4, respectively, in circuit lines 3, 2 and 4, their associated switches S1, S2 and S3 being normally deenergized. Since the sheet to be cut is metallic, it can be brought into engagement with any one of the contacts 54, 56 and 57 to bring the associated grid circuit to ground potential and cause conduction through the affected thyratron and energization of its associated switch, as well known in the art. This temporary electrical contact between the stock and the gauge contacts, selectively, is utilized to require operator adherence to a prescribed cutting program for production credit and to record the resulting production. To insure continuous energization of any of the switches S1, S2 and S3 while the sheet is engaged against one of the control contracts, despite any chattering or vibratory conditions that may be present, the electronic relays may be given a delay drop-out time characteristic of about one second or less, as by designing the R-C ratio values of the grid circuit for the desired drop-out time, as is well known in the art.

Figure 4:
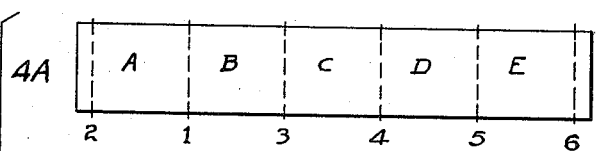
Fig. 4 is a graphic representation of the production standard programs or schedules which are used selectively for end shearing in what may be termed "regular or multiple cut work," illustrated at 4A; "double-cut work," shown at 4B; and "round-robin work" depicted at 4C.
Figure 4:
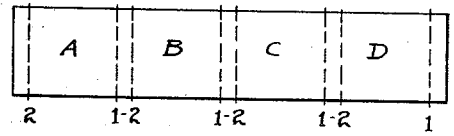
Figure 4:
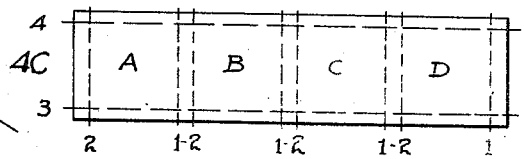

Before further describing the control circuit of Fig. 5, it may be helpful to described the method standards to which the shear operator must adhere. There are two basic types of shearing known as end shearing and side shearing. The first covers all work where the cuts are made at a right angle to the longest dimension of the started sheet. The second covers all work where the cuts are made parallel to the longest dimension of the started sheet. The end shearing programs are depicted in Fig. 4 and are selectively used to obtain a degree of squareness which will satisfy customer requirements. Schedule 4A is a regular or multiple cut practice in which two or more finished pieces are obtained from each started sheet, and having scrap at each end. The cutting sequence is A1, A2; B3, etc. Thereby, any stretcher jaw marking at the ends of the sheet and untrue or rough end edges which may be present are eliminated, while providing a true cut edge A1 for abutment against the length gauge block to insure accurate finished piece dimension. The whole sequence constitutes one work task.

Schedule 4B is a double cut practice, with one or more finished pieces produced from the started sheet, and having alternate finished pieces and scrap. The cutting sequence is A1, A2; B1, B2, etc. This double cutting results in producing a higher degree of squareness than the regular cut program in case of relatively severe lateral bow in the starting sheet, since the 180° inversion of each small piece A, B, etc., and its positioning against the length gauge and the straight edge tends to insure parallelism between cut edge A2 and the initially cut edge A1 and right angularity between the cut edges and the sides of the finished piece.

Schedule 4C is a round-robin practice, with one or more finished pieces produced from the started sheet and having cuts made on all four edges of each finished piece. The sequence of cutting is A1, A2, A3 and A4, and it repeats for each finished piece produced from the started sheet. Thereby, maximum squareness is obtained.

Each sequence involved in producing a finished piece by either schedule 4B or 4C constitutes one work task.

The side shearing program which is used to produce relatively narrow strips cut lengthwise of the started sheet is not illustrated, but corresponds to regular cut schedule 4A.

It is to be observed from Fig. 4 that each of the cutting schedules involves the same starting procedure; namely, cut A1 spaced inwardly from the adjacent end of the started sheet, followed by cut A2. Piece A remains on the front table after each cut, thereby facilitating its accurate placement in finish cut position and subsequent removal and stacking by the shear operator and preventing possibility of damage or marking the finished piece which otherwise would occur if the piece were allowed to drop from the cutting knives. In-feeding the sheets from the rear of the shear by an operator's helper facilitates sheet positioning over the overcut contact and also enables quite long starting sheets to be used conveniently. Since the production standards have identical starting sequences, control circuit complications are minimized.

Referring again to Fig. 5, additional control components include a relay LSR controlled by the shear limit switch LS, single coil control relays CR numbered 1 through 6 and latch type control relays LR1, LR2 and LR3, each having latch and trip coils L and T. As shown, conventional A.C. power to lines X and Y and D.C. power to lines + and − may be used to operate the control elements. A two-position selector switch PB enables the circuit to be put either on round-robin control or on regular and double-cut control, it being shown in position for the latter, thereby locking out relay CR5 and making gauge contact 57 ineffective. A control unit comprising a stepping switch 62 and a selector switch 63 is provided, together with three magnetically actuated counters or registers 64, 65 and 66. The relays, switches and counters may conveniently be wired and contained in a suitable box 67 (Fig. 1) and be mounted on the shear. Access into the box may be limited to authorized personnel by keeping its cover door under lock and key, to prevent tampering with the controls, as set for a preselected cutting program. Signal lights 68 of different colors and visible to the operator may be provided and be connected in parallel with certain of the control relays to show the operator when the sheet is contacting the gauge stop and the step reached in any program, and for trouble indicating purposes, as desired.

The stepping switch 62 and the selector switch 63 may be of the rotary type, each having three banks of contacts, with corresponding contacts in their respective banks interconnected, as shown. The stepping switch serves as a finish cut accumulator, its wipers 62a, 62b and 62c being advanced one step to the next contact each time its stepping magnet ST is operated. For example, use of a 20-point switch is convenient. It incorporates a set of self-operated interrupter contacts Int., shown in circuit line 7, whereby magnet ST may drive the wipers to "home" or "off" position in a switch reset operation, and a limit switch 69, in line 7, which terminates the reset operation. Relay CR6 is in parallel with ST and opens its R6 contacts in line 24 each time the stepping magnet is energized.

The selector switch 63 has consecutively numbered positions and serves as a program and count selector. Thus, for example, if the regular cut schedule is to be used and five finished pieces obtained from each started sheet, the switch is manually set in No. 5 position. This disposes its arm contact 70 on the fifth contact of its bank and its spanning contact arms 71 and 72 in position interconnecting the first four and the first five contacts of their contact banks, as shown. As thus set, the shear operator is required to follow the regular cut program and the registers make an accurate record of his activities.

The registers provide the following record. Register 66 counts the total number of production or finish cuts, which are defined as a cut made when a sheet or piece is in contact with either the length or width gauge contact. It thus records all finish cuts per task, as allowed by schedule. Register 65 counts (a) the total number of sheets started on multiple cut work and which are properly cut into the required number of correct-length product pieces and (b) the total number of pieces properly finished on either double-cut or round-robin work. In other words, it records the tasks started and completed to schedule. Register 64 counts (a) the total number of sheets which have been started on the regular or multiple cut schedule and which have not been cut into the specified number of correct-length product pieces and (b) the total number of pieces started on round-robin schedule and which have not been finish sheared to both length and width.

A summary of the mode of operation of the system for the respective programs may now be set forth. For convenience, the numbers 1 through 24 appearing along the left side of Fig. 5 identify circuit lines and the numerals appearing opposite a circuit line at the right side of Fig. 5 identify the circuit lines in which the contacts of the control relay contained in that circuit line will be found.

1—Operation, regular or multiple cut work

Preliminary to starting a production run on this schedule 4A, a supervisor sets selector switch PB in position closing PB-1 in line 9 and opening PB-2 in line 20. Count selector switch 63 is set in position corresponding to the number of finished product pieces to be produced from each sheet of a lot, typically No. 5 position for five product pieces, as heretofore mentioned. With the control locked-up in box 67, the shear operator is required to adhere to the thus selected program to obtain production credit on registers 65 and 66; if not, error count is made on register 64.

Start cut A1

A. Place sheet in shear from the rear, laterally abutted against straight edge 33 and with its front end overlying the prepositioned length gauge 48 and engaging overcut contact 56 (as shown in Fig. 1). This renders T3 and T1 conductive, since light to photocell is interrupted by presence of the sheet, and relays S2 and S4 energize. S2-1 in line 6 closes and S4-1 in line 14 opens. The latter causes CR4 to deenergize and its contacts return to normal with no effect at this time.

B. Trip shear: Limit switch LS in line 1 closes and energizes LSR. Thereby, CR2 in line 6 energizes through S2-1 and LSR-2 closed and:

(1) CR2-1, line 24, opens and removes registers 65 and 66 from circuit.

(2) CR2-2, line 22, closes and places register 64 in circuit. It increases its count by one if the previous sheet has not been properly completed, otherwise no count is added thereto.

(3) CR2-3, line 7, closes to complete a reset circuit for the stepping switch 62. These contacts CR2-3 have a time delay to close characteristic, or may be quick-acting and operate a timer, so as to provide a predetermined timing interval and allow register operation prior to the resetting operation. The reset circuit, line 7, extends through the interrupter contacts Int. and the contacts of limit switch 69 to stepping magnet ST, in line 16, of the stepping switch and its wipers are stepped around to off or home position by the self-opening of the Int. contacts, in which home position the limit switch 69 opens and terminates the reset operation.

(4) CR2-4, line 18, closes and energizes coil L of latch relay LR2, but with no effect as this step has no function for this work.

The shear thus makes cut A1 and its limit switch LS opens when the shear knife reaches top position. LSR drops-out and deenergizes CR2 whose contacts return to normal. Thus, the reset circuit opens, the circuit of LR2 opens, register 64 is taken out of circuit and registers 65 and 66 are put in circuit in readiness for counting.

C. Remove cut-off piece. Thereby, electronic relays S2 and S4 deenergize and their contacts return to normal. Thus S4-1 in line 14 closes and re-energizes CR4 for the interval between shearing cycles.

The foregoing steps complete the starting cut.

Finish cut A2

D. Invert the cut-off piece through 180° and reposition it in the shear with its cut edge A1 against front gauge contact 54 and with its same side edge against straight edge 33. Relays S1 and S4 energize. S1-1 is line 8 closes and energizes CR1 through PB-1, S4-1 in line 14 opens and deenergizes CR4.

(1) CR1-1 in line 10 closes with no effect till shear is tripped.

(2) CR1-2 in line 12 closes and energizes CR3, which, in turn, opens CR3-1 in line 14 and in effect blocks-out the photocell unit independently of S4-1.

(3) CR4 contacts return to normal, thus deenergizing the T coils of latch relays LR1 and LR3 and opening points in circuits 16, 17 and 19.

E. Trip shear: The shear signal by LS again energizes LSR, thereby closing LSR-1 in line 10 to energize coil L of latch relay LR1 which latches in and holds LR1-1 and LR1-2 in lines 16 and 19 closed with no effect at this time since relay CR4 is deenergized.

The shear makes cut A2 and LS opens at the end of the shear cycle. LSR drops out, thereby opening a point in the energizing circuit of LR1, but its contacts remain in operated position.

F. Remove finished product piece A. The operator conveniently may stack it on a suitable receptacle at the shear. Relays S1, S4, CR1 and CR3 deenergize, responsively to which S4-1 and CR3-1 in line 14 close, in series, and CR4 energizes, whereby:

(1) CR-4-4 in line 17 closes a point in circuit of LR2 (LR3-1 is open).

(2) CR4-3 in line 19 closes and energizes T coil of LR2 whose contacts return to normal.

(3) CR4-1 in line 16 closes and energizes CR6 and the stepping magnet ST (LR1-1 being closed). Thus, the stepping switch 62 advances one step (0 to 1 position) and at wiper 62a makes a circuit to register 66 through wiper arm 72 of selector switch 63, but the contacts R6 in line 24 remain open until the stepping magnet is deenergized.

(4) CR4-2 in line 11, being time-delay-to-close contacts, close and energize the trip coils T of latch relays LR1 and LR3. The timing period of CR4-2 allows proper operation of the stepping switch. Tripping of LR1 and return of its contacts to normal position deenergizes ST and CR6, whereupon R6 in line 24 closes and register 66 energizes to add one count to its total. Thus, the finish cut A1, just made, is recorded. In addition, the stepping magnet is prevented from being advanced more than once for each finish cut even though an attempt may be made to operate the photocell unit surreptitiously.

G. The remainder of sheet 53 is advanced into cutting position, its cut edge B1 being engaged against finish gauge contact 54, thereby effecting the relay operation described in step D.

H. Steps E and F are now repeated, resulting in the stepping switch 62 moving to position 2 and the register 66 adding one count to its total. The finished product piece B may be stacked on piece A.

I. Steps G and H are repeated for finish cuts C4–D5–E6. Each cut is registered on register 66. The stepping switch is advanced one step at each cut. It reaches fifth position on the last finish cut E6; thereby, at wiper 62b, completing the circuit to register 65 so that this register adds one count to its total, to thus record proper completion of the started sheet to schedule. In addition, the circuit for register 64 is opened at wiper 62c so that no operator error count will be made thereon when the next sheet of the lot is started. However, if less than the scheduled number of finish cuts are made, say four instead of five, register 65 will not be actuated, and one error count will be made on register 64 when the next sheet is started. Register 66 will register only as many cuts as is set on the selector switch 63.

From the foregoing, it will be seen that the operator must follow the regular cut schedule to obtain production credit and that the requirement of contacting the sheet against the length gauge for operation of the controls assures the production of accurately dimensioned product pieces.

II—Operation, double-cut work

For this schedule 4B, selector switch PB is set in position closing PB–1 and opening PB–2 (same position as for regular work) and count selector switch 63 is set in No. 1 position.

A. Start cut A1: Same as steps 1A–1B–1C, supra. Stepping switch 62 resets to home position.

B. Finish cut A2: Same as steps 1D–1E–1F, supra. Stepping switch 62 steps to position 1. One count is added to register 65 as one task completed, and one count is added to register 66 as one product piece produced.

C. Repeat steps IIA and IIB for each piece B, C, etc., to be produced from the started sheet.

It will be seen that for double-cut work, the stepping switch resets to home position at each start cut and steps to point 1 at each finish cut and that registers 65 and 66 increase their counts by one for each product piece. This is normal schedule. Register 64 is not used for this work. If the operator follows up a normal overcut with another overcut instead of a finish cut, no count will be recorded on the registers. Also, if he follows up a finish cut with another finish cut instead of an overcut, no counts will be recorded on the registers. Hence, he must follow the prescribed schedule to obtain production credit, thereby assuring properly finished product pieces.

III—Operation, round-robin work

When this schedule is to be used, selector switch PB is set in position opening PB–1 and closing PB–2, thereby bringing the width gauge contact 57 into service. Count selector switch 63 is set in No. 2 position. This may cause operation of the registers. They are read after making the first cut on this or any other schedule to serve as the starting totals. Each product piece is cut on all four sides, so the control functions to give two counts on register 66 and one count on register 65.

A. Start cut A1: Same as steps 1A–1B–1C, supra. At step 1B, the shear signal homes the stepping switch (step 1B3) and energizes latch relay LR2 (step 1B4) which, by closing LR2–1 in line 8 and opening LR2–2 in line 20, in effect, makes gauge contact 54 effective and gauge contact 57 ineffective at this time.

B. Finish cut A2: Same as steps 1D and 1E, supra, except that relay CR1 is energized through LR2–1, since PB–1 is open. LR1 is latched in and CR3 is energized.

C. Remove partially finished piece from shear, whereupon step 1F, supra, occurs and CR4 energizes and effects the operations described at 1F1 through 4; namely, (a) Stepping switch goes to No. 1 position and one count is added to register 66.

(b) Point in circuit of LR2 closed (line 17).

(c) Trip coil of LR2 energizes and unlatches LR2 whose contacts return to normal and make gauge contact 54 ineffective and gauge contact 57 effective.

(d) Trip coils T of LR1 and LR3 energize after a time delay and LR1 unlatches and its contacts return to normal, thus opening the stepping magnet operating circuit.

D. Side cut A3: Piece A is turned 90° and repositioned in the shear with either cut end A1 or A2 against straight edge 33 and with uncut side A4 overlying prepositioned width gauge 49. No circuit is made at gauge 49 and only photocell controlled relay S4 energizes and idly deenergizes CR4 at this time. Upon tripping the shear to make cut A3, the control circuit remains inactive, so the stepping switch is not advanced and the cut is not registered.

E. Side cut A4: Piece A is picked up, turned 180° and placed against straight edge 33 and with its cut side A3 against front contact 57 of width gauge 49. Relays S3 and S4 energize. S4–1 in line 14 opens and deenergizes CR4. S3–1 in line 20 closes and energizes CR5 (LR2–2 and PB–2 being closed). Thereby, (a) CR5–2 in line 13 closes and CR3 energizes to block out CR4 independently of the photocell unit.

(b) CR5–1 in line 21 closes a point in the circuit of LR3.

F. Trip shear: The shear signal by LS again operates LSR and closing of LSR–3 in line 21 energizes coil L of LR3 whose contacts in lines 15 and 17 close to prepare points in these circuits. LSR deenergizes at the end of the shear cycle and opens line 21 circuit.

G. Remove completed piece and stack: S3 and S4 drop out. CR5 drops out and deenergizes CR3. Line 14 circuit is thus completed and CR4 energizes, whereby:

(a) CR4–1 in line 16 completes stepping magnet operating circuit. Stepping switch advances to No. 2 position, thereby adding one finished task count to register 65, and adding one finish cut count to register 66 (after the stepping circuit opens).

(b) CR4–3 in line 19 closes (no effect since LR1–3 is open).

(c) CR4–4 in line 17 completes circuit to coil L of LR2 whose contacts operate to make gauge contact 57 inactive and gauge contact 54 active for finish end cut on the next piece.

(d) CR4–2 in line 11 closes after a time delay and trips latch relay LR3, thus opening the stepping magnet circuit and ST deenergizes.

This completes the round-robin operation and readies the circuit for repetition of steps III—A through G for each remaining piece from the started sheet. As is the case with the regular schedule, the operator must follow the round-robin program exactly for production credit, otherwise error counts will be recorded on register 64.

The operation for the side shearing program earlier mentioned is identical to that described for regular cut schedule I, gauge 49 not being used and gauge 48 being preset in position according to the width desired for the product pieces.

Since square shearing requires manipulation of the work, as above described, it is not possible to count the shear operations as a record of production, in this invention, shear operations are used to trigger the production control, in combination with circuits which can only be established by disposition of the work in cutting position in the shear. In addition, the control will not function if these circuits are not interrupted between cutting operations.

Having thus fully described the invention, in one embodiment thereof, it will be apparent to those skilled in the art that various changes in the form and details of components and circuits employed may be made without departing from the scope of the invention as defined in the appended claims.

What is claimed is:

1. A system for recording production operations of a machine having a tool movable through one cycle at each operation thereof, comprising a signal switch actuated at each operation of said tool, a gauge on said machine for locating a workpiece in operating position with respect to said tool, independent top and front circuit-making means on said gauge with which said workpiece is required to be selectively engaged to perform a work task in compliance with a prescribed operating schedule, a first register for counting the number of work tasks started and completed to said schedule, a second register for counting the number of tool operations allowed by said schedule for completing a work task, a control unit under lock and key and comprising a magnetically actuated stepping switch having a home position and a count selector switch, each having a bank of contacts with their contacts circuit-connected individually to each other, said selector switch being preset in a task-completed position determinative of the number of step operations of said stepping switch to reach a corresponding position, a reset circuit controlled by said top circuit-making means for actuating said stepping switch to its said home position responsively to actuation of said signal switch during initial operation of said tool on said workpiece, an operating circuit controlled by said front circuit-making means for effecting a single step operation of said stepping switch responsively to actuation of said signal switch during operation of said tool immediately successive to said initial operation thereof and for actuating said second register to increase its count by one, and means under the control of said selector and stepping switch unit for actuating said first register to increase its count by one when said unit reaches said task-completed position.

2. A production control and recording system for a machine in which a tool is actuated through one cycle at each operation thereof and in which presentation of a workpiece in different positions with respect to said tool is required between successive operations thereof to complete a work task in compliance with a prescribed schedule and produce finished items from the workpiece, comprising a signal switch actuated at each operation of said tool, a gauge on said machine in preset position with respect to said tool, independent top and front circuit-making means on said gauge with which said workpiece is required to be engaged, first against said top and thereafter against said front circuit-making means in order to comply with said schedule, a first register for counting the number of work tasks started and completed to said schedule, a second register for counting the number of tool operations allowed by said schedule for completing a work task, a control unit under lock and key, said unit comprising a magnetically actuated stepping switch having a home position and a count selector switch, each having a bank of contacts with their contacts circuit-connected individually to each other, said selector switch being preset in a task-completed position determinative of the number of step operations of said stepping switch to reach a corresponding position, a reset circuit controlled by said top circuit-making means and said signal switch for resetting said stepping switch to its said home position when said tool starts a work task on said workpiece, an operating circuit controlled by said front circuit-making means and said signal switch for effecting a single step operation of said stepping switch and for actuating said second register to increase its count by one upon operation of said tool immediately successive to said task starting operation thereof, means under the control of said selector and stepping switch unit for actuating said first register to increase its count by one when said unit reaches said task-completed position, and means including a photocell unit for controlling said operating circuit for said stepping switch in conformity with the presence and absence of said workpiece in working position with respect to said tool.

3. The combination with a guillotine shear for producing square cut product pieces from sheets, said shear including a front table having a lateral straight edge and a length gauge block for locating a sheet in cutting position, of a production control and recorder therefor characterized by requiring operator adherence to a prescribed shearing schedule, and comprising a signal switch actuated during each shear operation, an electromagnetically actuated stepping switch having a home position and a bank of contacts, a count selector switch having a bank of contacts connected individually to those of said stepping switch, said selector switch being preset in a position selecting the number of finish cuts allowed to complete a work task in compliance with said shearing schedule, a finish cut counting register, a reset circuit for driving said stepping switch to said home position, an operating circuit for effecting actuation of said register and said stepping switch a single step for each finish cut, said reset and operating circuits being activated by said signal switch, and separate control switch means including front and top contacts on said length gauge block requiring engagement of said sheet therewith in an overcut and a finish cut sequence for selectively establishing said reset and said operating circuits for activation by said signal switch, in complying with said shearing schedule at the start thereof.

4. The combination as defined in claim 3 in which a sheet sensing photocell unit is provided on said table, together with relay means controlled thereby for precluding actuation of said stepping switch and said counter upon operation of the shear without a sheet in a cutting position.

5. The combination with a guillotine shear having a front sheet supporting table provided with a lateral straight edge and a length gauge block for locating a sheet in square cutting position, and means for accommodating sheet infeed from the rear of the shear, of a production control and recorder therefor characterized by requiring operator adherence to a sheet positioning and shearing sequence in accordance with a prescribed schedule, and comprising a shear actuated signal switch, a top overcut contact and a front finish cut contact on said gauge block with which said sheet is required to be selectively engaged in an overcut and finish cut sequence to start a work task in compliance with said schedule, an electromagnetically actuated stepping switch having a home position and a bank of contacts, relay means controlled by said overcut contact and said signal switch for actuating said stepping switch to said home position when said overcut is made, other relay means under the control of said finish cut contact and said signal switch for effecting a single step actuation of said stepping switch when said finish cut is made, a count selector switch under lock and key and having a bank of contacts connected individually to those of said stepping switch and movable contact means manually set on a contact of its bank to select the number of finish cuts involved per task within said schedule and determinative of the number of step operations of said stepping switch to reach the corresponding contact of its bank and establish a count terminating circuit, a first, a second and a third register adapted to show, respectively, the number of finish cuts made to schedule, the number of tasks started and completed to schedule and the number of tasks not completed to schedule, means for actuating said first register to add one count thereto for each single step advancement of said stepping switch, and circuit means controlled by said selector and stepping switches for actuating said second register to add one count thereto when said count terminating circuit is established and for conditioning said third register for actuation responsively to any subsequent operation of said stepping switch other than said homing operation.

6. The combination as specified in claim 5 in which each of said top and front contacts controls an associated electronic relay having a predetermined time delay to de-energize characteristic, whereby disabling of either of said relay means by accidental disengagement between the sheet and either of said contacts is prevented.

7. The combination with a guillotine shear for square cutting sheets, each into a plurality of dimensioned product pieces, said shear having a front table provided with a lateral straight edge and an adjustable length gauge block, and means for accommodating sheet infeed from the rear of the shear, of a production control and recorder therefor requiring operator adherence to a prescribed schedule, said schedule involving disposal of an end portion of a started sheet in overlying relation to said gauge, an overcut, pick-up and 180° inversion of the cut-off piece and disposal of its cut edge against the front of said gauge block and a finish cut on its opposite end, followed by repeated positioning of the remainder of the sheet against the front of said gauge block and finish cutting successive product pieces therefrom, said control and recorder comprising a shear actuated signal switch, a detector switch including a photocell unit on said table for sensing the presence of a sheet to be cut, a top overcut contact and a front finish cut contact on said gauge block for selective engagement by the sheet, a control unit under lock and key and comprising a magnetically actuated stepping switch having a home position and a selector switch, each having a bank of contacts with corresponding contacts connected to each other, said selector switch being initially preset in a sheet-finished position determined by the number of finished product pieces that are to be obtained from each sheet, and thereby determining the number of step operations of said stepping switch required to reach a corresponding position, a reset circuit controlled by said top contact and said signal switch for driving said stepping switch to said home position when said overcut is made, first and second registers adapted to show, respectively, the number of sheets started and completed to schedule and the number of finished pieces produced from each sheet, an operating circuit under the control of said front contact and said signal switch for actuating said stepping switch one step and for actuating said second register to increase its count by one for each finish piece produced, and means under the control of said control unit for actuating said first register to increase its count by one when said control unit reaches said sheet-finished position, said detector switch controlling said operating circuit and requiring removal of each cut-off piece from said table between successive cuts before said operating circuit can be actuated for operating said stepping switch and registers.

References Cited in the file of this patent
UNITED STATES PATENTS

| | | |
|---|---|---|
| 1,745,873 | Stoltz | Feb. 4, 1930 |
| 2,346,869 | Poole | Apr. 18, 1944 |
| 2,797,049 | Henrici et al. | June 25, 1957 |

UNITED STATES PATENT OFFICE
CERTIFICATE OF CORRECTION

Patent No. 2,905,242                                                  September 22, 1959

Robert E. Heffner

It is hereby certified that error appears in the printed specification of the above numbered patent requiring correction and that the said Letters Patent should read as corrected below.

Column 1, line 31, for "devices" read -- devised --; column 6, line 36, for "is" read -- in --.

Signed and sealed this 22nd day of March 1960.

(SEAL)
Attest:

KARL H. AXLINE
Attesting Officer

ROBERT C. WATSON
Commissioner of Patents